US006881257B2

(12) United States Patent
Beauboeuf

(10) Patent No.: US 6,881,257 B2
(45) Date of Patent: Apr. 19, 2005

(54) MACHINABLE LIGHT WEIGHT SISAL-BASED CONCRETE STRUCTURAL BUILDING MATERIAL

(76) Inventor: Seymour Beauboeuf, 20681 NE. 4th Pl., #103, North Miami Beach, FL (US) 33179

( * ) Notice: Subject to any disclaimer, the term of this patent is extended or adjusted under 35 U.S.C. 154(b) by 69 days.

(21) Appl. No.: 10/616,149

(22) Filed: Jul. 10, 2003

(65) Prior Publication Data

US 2005/0005822 A1 Jan. 13, 2005

(51) Int. Cl.[7] .............................. C04B 16/02; B28B 1/14
(52) U.S. Cl. ....................... 106/731; 106/675; 106/677; 106/681; 106/694; 106/696; 106/698; 106/720; 106/803; 106/805; 264/333
(58) Field of Search ................................. 106/675, 677, 106/681, 694, 696, 698, 720, 731, 803, 805; 264/333

(56) References Cited

U.S. PATENT DOCUMENTS

| | | | | |
|---|---|---|---|---|
| 3,719,513 | A | * | 3/1973 | Bragg et al. |
| 3,827,895 | A | * | 8/1974 | Copeland |
| 3,933,515 | A | * | 1/1976 | Yang |
| 4,047,962 | A | * | 9/1977 | Copeland |
| 4,225,359 | A | * | 9/1980 | Schneider |
| 4,343,127 | A | * | 8/1982 | Greve et al. |
| 4,363,666 | A | * | 12/1982 | Johnson et al. |
| 4,377,415 | A | * | 3/1983 | Johnson et al. |
| 4,428,775 | A | * | 1/1984 | Johnson et al. |
| 4,840,672 | A | * | 6/1989 | Baes |
| 5,232,779 | A | * | 8/1993 | Spehner |
| 5,494,748 | A | * | 2/1996 | Spehner |
| 5,749,954 | A | | 5/1998 | Law et al. |
| 6,017,595 | A | | 1/2000 | Brenot et al. |
| 6,248,812 | B1 | * | 6/2001 | Symons |
| 6,438,915 | B1 | | 8/2002 | Beauboeuf |

FOREIGN PATENT DOCUMENTS

| | | | |
|---|---|---|---|
| DE | 3209488 A1 | * | 9/1982 |
| DE | 3902023 A1 | * | 7/1990 |
| FR | 2033843 A | * | 12/1970 |
| FR | 2483492 A | * | 12/1981 |
| GB | 1298874 A | * | 12/1972 |
| GB | 2051169 A | * | 1/1981 |
| GB | 1603625 A | * | 11/1981 |
| GB | 2077317 A | * | 12/1981 |

OTHER PUBLICATIONS

Derwent Abstract No. 1981–55152D, abstract of Belgium Patent Specification No. 887951A (Jul. 1981).*
Derwent Abstract No. 1984–113877, abstract of South Africa Patent Specification No. 8302800A (Dec. 1983).*
Derwent Abstract No. 1987–192597, abstract of South Africa Patent Specification No. 8607449A (Mar. 1987).*
Derwent Abstract No. 1993–352112, abstract of South Africa Patent Specification No. 9209810A (Aug. 1993).*
Chemical Abstract No. 109:97949, abstract of German Pateant Application No. DD253549 A3 (Jan. 1988).*

* cited by examiner

Primary Examiner—Anthony J. Green
(74) Attorney, Agent, or Firm—M. K. Silverman; Yi Li

(57) ABSTRACT

A machinable light weight sisal-based concrete structural building material and a method of making the same are disclosed. The material includes short sisal fibers in a range from about 22% (v/v) to about 33% (v/v); a cement in a range from about 12% (v/v) to about 22% (v/v); and perlite in a range from about 51% (v/v) to about 59% (v/v). The method includes the steps of mixing an amount of cement with an amount of perlite to form a solid mixture; adding water and mixing water with the solid mixture to form a sludge; adding an amount of sisal fibers and mixing the sisal fibers into the sludge to form an uniform final composition; and pouring the final composition into a mold and setting the final composition to a solid form structural building material. The produced structural building material can be machined, screwed, cut, and nailed.

15 Claims, No Drawings

MACHINABLE LIGHT WEIGHT SISAL-BASED CONCRETE STRUCTURAL BUILDING MATERIAL

FIELD OF THE INVENTION

The present invention relates to a machinable light weight concrete structural building material. More particularly, the present invention relates to a light weight sisal-based concrete structural building material which possesses wood-like properties, and can be cut, screwed, and nailed.

BACKGROUND OF THE INVENTION

Species Agave sisalana, or sisal, as it is commonly called, is a plant of Agavaceaw family. Its fiber has been recognized as the most important of the leaf fiber group. This group consists of hard, coarse fibers. Such fibers, often referred to as "hard fibers", are usually long and stiff and are typically used in the cordage industry to produce ropes and twines. Other than its agricultural uses, sisal is also employed by the marine, shipping and industrial sectors to produce rugs, matting, brushes and marine-type ropes. Sisal pulp is also used in paper industry. Sisal pulp has certain characteristics such as high tear resistance, high alpha cellulose content, high porosity, high bulk, high absorbency which make sisal pulp suitable for many specialty papers.

Long sisal fiber and its products is the mainstay of the industry and this is what has kept the industry going. This is, however, only two percent of the sisal plant. The rest is a biomass and short fibers which have been thrown away or burn at cost financially and environmentally. In the worldwide production of fiber of 300,000 tons, about 15,000,000 million tons is the biomass and short fibers called "waste". This is more prevalent in Africa where the mode of production has predominantly been estate based and therefore leaves are transported to a central factory for decortication thus disposal of this huge amount of biomass becomes a problem. The traditional answer has been to pump in a lot of water to convey this material from the decorticator, at some places directly into a river causing oxygen depletion in the water. The return from the plant therefore has been low due to this low utilization.

Research has been going on to establish how best to exploit this huge quantity of biomass commercially. Focus is now on using this as a source of energy (biogas and electricity), animal feed, organic soil improver, pharmaceuticals, and raw materials for bags and padding.

Furthermore, the sisal industry is concentrated in the mostly tropical regions of Africa, Central and South America and Asia (particularly China). It is produced in some of the poorest areas of the world and in many cases it is the only source of income and economic activity in those areas. Thus it contributes significantly to the efforts to reduce poverty and provide rural employment to nearly six million people.

Therefore, it is beneficial if short sisal fiber can be utilized in the construction industry where bulk volume of raw material consumption is commonly required.

U.S. Pat. No. 6,017,595 (to Brenot et al) discloses a mixed composition for making structural building materials, which comprises a reprocessed waste material such as impure lime obtained from water treatment plant; a reinforcing material such as fiberglass, metal material, sisal fiber, or plastics; and a polymeric material preferably including polyurethane foam. More specifically, Brenot et al teach the mixed composition comprising 20 to 40% of waste material, 5 to 20% of reinforcing material, and 40 to 75% of polymeric material. U.S. Pat. No. 6,438,915 (to Beauboeuf) discloses a prefabricated wall panel as a new type of wall structure. The wall panel is composed of perlite, cement, water and sisal fibers of 1 to 2 inches length.

On the other hand, light weight concrete has been produced with various compositions for construction industry. Perlite is a common component of light weight concrete. Perlite is a generic term for naturally occurring siliceous rock. There are many uses for perlite, generally in three categories, construction applications, horticultural applications and industrial applications. Because of perlite's outstanding insulating characteristics and light weight, it is widely used as a loose-fill insulation in masonry construction. In addition to providing thermal insulation, perlite enhances fire ratings, reduces noise transmission and it is rot, vermin and termite resistant. When perlite is used as an aggregate in concrete, a light weight, fire resistant, insulating concrete is produced that is ideal for roof decks and other applications. Perlite can also be used as an aggregate in Portland cement and gypsum plasters for exterior applications and for the fire protection of beams and columns. Other construction applications include under-floor insulation, chimney linings, paint texturing, gypsum boards, ceiling tiles, and roof insulation boards.

Most of light weight concrete is used for building and roof constructions, which possess many basic properties of regular concrete, such as strength and hardness. These materials can not be machined, nailed or screwed like wood materials. Therefore, their utilities are limited to only certain applications.

In another aspect, air-entraining agents are commonly used in producing Portland and masonry cement, and other construction materials. Air entrainment is the process whereby many small air bubbles are incorporated into concrete and become part of the matrix that binds the aggregate together in the hardened concrete. These air bubbles are dispersed throughout the hardened cement paste; they act like flexible ball bearings increasing the plasticity and workability of the cement paste. Entrainment of air is accomplished by the development of microscopic bubbles, introduced by agitation and stabilized by the air-entraining agents in the paste phase of the mortar or concrete. It is known that the use of air-entraining agents increases freeze-thaw and scaling resistances of the air-entrained concrete, improves placeability, and reduces bleeding and segregation of fresh concrete. The air-entrained concrete is more workable than non-entrained concrete.

The air-entraining agents are organic additives, and most commonly used are chemical surfactants which can be categorized into four groups: salts of wood resins; synthetic detergents; salts of petroleum acids; and fatty and resinous acids and their salts. One of commonly used air-entraining agents in cement industry is an aqueous solution of neutralized hydroaromatic and fatty carboxylic acids, commercially available under the trade name of Airalon®, from Grace Construction Products, Cambridge, Mass. 02140. It is known that Airalon® generates stable air, has low addition rates, and it is easy and safe to handle. The dosage rate of Airalon® depends on the fineness and the air content requirement of each cement, and it is in general in a range from 0.03% to 0.35%.

German patent No. 00203549 A3 discloses a machinable, nailable, and screwable wood-based concrete. The concrete consists of Portland cement, concrete sand, and wood chips in a volume ratio of 1:1:4. To produce this concrete, coarse wood chips is soaked in water for 48 hrs, then mixed with cement and concrete sand to form the wood concrete. Although the prior art expands the concrete properties, it is evident from the composition that a large quantity of wood is required for making such a concrete. It is known to the general public that wood is one of the most valuable natural resource and preservation of trees and forests has significant impacts on our environment.

Based on the above described, it is apparent there is need for an improved light weight concrete which does not use wood, but possesses wood properties so that the concrete can be machined, nailed, and screwed. There is also a strong need for effectively utilizing short sisal fibers in construction or other industries, to turn the current waste into valuable raw material source.

SUMMARY OF THE INVENTION

In one embodiment, the present invention is related to a machinable light weight sisal-based concrete structural building material, which comprises sisal fibers in a range from about 22% (v/v) to about 33% (v/v); a cement in a range from about 12% (v/v) to about 22% (v/v); and a light weight mineral substance in a range from about 51% (v/v) to about 59% (v/v). The light weight mineral substance is preferably perlite. The sisal fibers have a length in a range from about 0.75 inch to about 2.0 inches.

In another embodiment, the machinable light weight sisal-based concrete structural building material of the present invention further comprises a sufficient amount of an air-entraining agent to enhance plasticity and workability of the material.

In a further embodiment, the present invention is related to a method of producing the machinable light weight sisal-based concrete structural building material. The method includes the steps of mixing a pre-measured amount of a cement with a pre-measured amount of perlite thoroughly to form an uniform solid mixture; adding a pre-measured amount of water, and mixing said water with said solid mixture thoroughly to form a sludge; adding a pre-measured amount of sisal fibers, and mixing the sisal fibers into the sludge thoroughly to form an uniform final composition; and pouring said final composition into a mold, and setting said final composition in said mold to a solid form structural building material. The produced structural building material possesses wood-like properties. It is very light in weight and can be machined, screwed, cut, and nailed.

It is an object of the present invention to provide a composition of a light weight machinable concrete structural building material that can be machined, screwed, cut, and nailed.

It is a further object of the present invention to provide a method of producing a lightweight machinable concrete structural building material.

It is another object of the present invention to provide an effective utilization of short sisal fibers for construction industry.

The above and yet other objects and advantages of the present invention will become apparent from the hereinafter set forth Detailed Description of the Invention and claims appended herewith.

DETAILED DESCRIPTION OF THE INVENTION

In one embodiment, the present invention provides a machinable light weight sisal-based concrete structural building material, which comprises a sufficient amount of sisal fibers, cement, and a light weight mineral substance.

The sisal fibers are the short sisal fibers. The short sisal fibers are available from any sisal fiber manufacturing plant. The sisal fibers are preferably in a range from about 22% to about 33% (volume by volume) of the total solid components. In general, when more sisal fibers are used in the composition, the structural building material is softer and easier to process. The processing and machinability herein include cutting by a saw, nailing, screwing and other suitable construction processes. Such machinability is more demandable for interior construction materials. When less sisal fibers are used in the composition, the structural building material is harder and stronger, which is more suitable for exterior use.

The light weight mineral substance can be perlite, pumice, expanded clay, mineral dust and lime. In a preferred embodiment, perlite is used because of its light weight, thermal insulation and sound absorbing properties. Preferably, the amount of perlite is in a range from about 50% to about 60% (volume by volume) of the total solid components. Cement is the binder of the structural building material. Preferably, Portland cement is used.

The amount of perlite and sisal fibers can vary depending on the desired weight and intended use of the structural building material. In general, for interior use, such as used as insulation boards or interior walls, more perlite and sisal fibers are used. While for exterior use, such as used as exterior walls, less perlite and sisal fibers are used.

In one embodiment, the machinable light weight sisal-based concrete structural building material comprises sisal fibers about 29% (v/v), Portland cement about 14% (v/v) and perlite about 57% (v/v). The sisal fibers have a length from about 1.0 inch to about 1.5 inches, cut from sisal ropes. The resulted concrete material is light weight and possesses various wood properties. It can be cut by a saw, can be nailed and screwed easily. A board or a block made of this concrete material can be conveniently used for various interior construction components.

In another embodiment, the machinable light weight sisal-based concrete structural building material comprises sisal fibers about 27% (v/v), Portland cement about 20% (v/v) and perlite about 53% (v/v). The sisal fibers are from about 1.0 inch to about 1.5 inches long. The resulted concrete material can be cut by a saw, can be nailed and screwed, however it is harder and stronger, and more suitable for use as exterior construction components.

It has been found that if short sisal fibers are 20% or less in the composition, the resulted concrete can be too hard for processing and does not possess sufficient machinability. On the other hand, if sisal fibers concentration is too high, above 35%, the resulted concrete can be too soft, and does not have sufficient strength for use as a construction material.

Furthermore, preferably, the length of the sisal fibers is in a range from about 0.75 inch to about 2.0 inches, and more preferably, from about 1.0 to about 1.5 inches. It has been found that sisal fibers of this range provides enhancement of the strength of the structural material produced. When the sisal fibers are too long, it is difficult to mix with other components uniformly during process; and when the sisal fibers are too short, they do not provide optimal enhancement of the structural material strength.

In yet another embodiment, the machinable light weight sisal-based concrete structural building material can comprise an air-entraining agent to further enhance plasticity and workability of the material. Various commercially available air-entraining agents can be used. One suitable example includes Airalon® an aqueous solution of neutralized hydroaromatic and fatty carboxylic acids, from Grace Construction Products, Cambridge, Mass. 02140. Preferably, Airalon® in a rate from about 0.005% to about 0.03% (volume by volume, of the total solid contents can be used.

In a further aspect, the present invention provides a method of producing a machinable light weight sisal-based concrete structural building material. The production method includes mixing a pre-measured amount of cement with a pre-measured amount of perlite thoroughly to form an uniform solid mixture; adding a pre-measured amount of water, and mixing water with the solid mixture to form a sludge; then adding a pre-measured amount of sisal fibers, and thoroughly mixing the sisal fibers into the sludge to form an uniform final composition; and finally pouring the final composition into a mold and setting the final composition to a solid form structural building material.

As one example, the machinable light weight sisal-based concrete structural building material described above in one of the embodiments was produced as follows: mixing 1.5 part (volume) of Portland cement with 4 part (volume) of perlite thoroughly in a preparation tank; adding 1.5 part (volume) of water into the tank, and mixing the mixture into an uniform sludge; then adding 2 part (volume) of short sisal fibers into the tank, and thoroughly mixing the short sisal fibers into the sludge and forming a final composition; pouring the final composition into a mold with a predetermined shape, such as a column, and setting the final composition at room temperature into a solid structural building material of predetermined shape.

When the air-entraining agent is used, the method further includes the step of addition of the air-entraining agent, according to the instruction of the air-entraining agent manufacturer.

The machinable light weight sisal-based concrete structural building material of the present invention can be made into various shapes and structures for construction purpose, which include, but not limited to, solid block, pre-shaped hollow building block, interior and exterior wall system, precast form for beam, lintel, window sill, column, precast slab, artistic and architectural form, drop ceiling panels, acoustic panels, roofing tiles, boards, frames, and other suitable interior and exterior construction components. Additionally, the material of the present invention can also be used for piping for refrigeration, marine usage, aeronautical usage and automotive usage.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

What is claimed is:

1. A machinable light weight sisal-based concrete structural building material comprising:
   (a) sisal fibers in a range from about 22% (v/v) to about 33% (v/v),
   (b) a cement in a range from about 12% (v/v) to about 22% (v/v), and
   (c) a light weight mineral substance in a range from about 51% (v/v) to about 59% (v/v).

2. The machinable light weight sisal-based concrete structural building material of claim 1, wherein said light weight mineral substance is perlite.

3. The machinable light weight sisal-based concrete structural building material of claim 2, wherein said cement is Portland cement.

4. The machinable light weight sisal-based concrete structural building material of claim 3, wherein said sisal fibers have a length in a range from 0.75 inch to about 2.0 inches.

5. The machinable light weight sisal-based concrete structural building material of claim 4, wherein said sisal fibers are in a range from about 25% (v/v) to about 30% (v/v).

6. A machinable light weight sisal-based concrete structural building material comprising:
   (a) sisal fibers in a range from about 22% (v/v) to about 33% (v/v),
   (b) a cement in a range from about 12% (v/v) to about 22% (v/v),
   (c) a light weight mineral substance in a range from about 51% (v/v) to about 59% (v/v), and
   (d) a sufficient amount of an air-entraining agent.

7. The machinable light weight sisal-based concrete structural building material of claim 6, wherein said light weight mineral substance is perlite.

8. The machinable light weight sisal-based concrete structural building material of claim 7, wherein said cement is Portland cement.

9. The machinable light weight sisal-based concrete structural building material of claim 8, wherein said sisal fibers have a length in a range from 0.75 inch to about 2.0 inches.

10. The machinable light weight sisal-based concrete structural building material of claim 9, wherein said sisal fibers are in a range from about 25% (v/v) to about 30% (v/v).

11. The machinable light weight sisal-based concrete structural building material of claim 10, wherein said air-entraining agent is an aqueous solution of hydroaromatic and fatty carboxylic acids.

12. A method of producing a machinable light weight sisal-based concrete structural building material comprising steps of:
   (a) mixing from about 12%(v/v) to about 22%(v/v) of a total of solid contents of a cement with from about 51%(v/v) to about 59%(v/v) of said total solid contents of a light weight-mineral substance thoroughly to form a uniform solid mixture;
   (b) adding water, and mixing said water with said solid mixture thoroughly to form a sludge;
   (c) adding from 22%(v/v) to about 33%(v/v) of said total solid contents of sisal fibers, and mixing the sisal fibers into the sludge thoroughly to form a uniform final composition; and
   (d) pouring said final composition into a mold, and setting said final composition in said mold to a solid form structural building material;
   wherein said structural building material can be machined, screwed, cut, and nailed.

13. A method of producing a machinable light weight sisal-based concrete structural building material of claim 12 further comprising adding a sufficient amount of an air-entraining agent, and mixing said air-entraining agent with said final composition, prior to pouring said final composition into said mold.

14. A method of producing a machinable light weight sisal-based concrete structural building material of claim 12, wherein said light weight mineral substance is perlite.

15. A method of producing a machinable light weight sisal-based concrete structural building material of claim 12, wherein said sisal fibers have a length in a range from about 0.75 inch to about 2.0 inches.

* * * * *